United States Patent
Prasad et al.

(10) Patent No.: US 10,291,370 B2
(45) Date of Patent: May 14, 2019

(54) DUAL CONNECTIVITY IN HETEROGENEOUS CELLULAR NETWORKS

(71) Applicant: NEC Laboratories America, Inc., Princeton, NJ (US)

(72) Inventors: Narayan Prasad, Willow Grove, PA (US); Mohammad Khojastepour, Lawrenceville, NJ (US); Sampath Rangarajan, Bridgewater, NJ (US)

(73) Assignee: NEC Corporation, Tokyo (JP)

( * ) Notice: Subject to any disclaimer, the term of this patent is extended or adjusted under 35 U.S.C. 154(b) by 3 days.

(21) Appl. No.: 15/867,074

(22) Filed: Jan. 10, 2018

(65) Prior Publication Data
US 2018/0198577 A1 Jul. 12, 2018

Related U.S. Application Data (60) Provisional application No. 62/445,037, filed on Jan. 11, 2017.

(51) Int. Cl.
| | |
|---|---|
| *H04L 5/00* | (2006.01) |
| *H04W 72/04* | (2009.01) |
| *H04W 72/08* | (2009.01) |
| *H04W 84/04* | (2009.01) |
| *H04W 16/10* | (2009.01) |
| *H04W 24/02* | (2009.01) |

(52) U.S. Cl.
CPC .......... *H04L 5/0032* (2013.01); *H04W 16/10* (2013.01); *H04W 72/048* (2013.01); *H04W 72/0446* (2013.01); *H04W 72/082* (2013.01); *H04W 72/085* (2013.01); *H04W 84/045* (2013.01); *H04W 24/02* (2013.01)

(58) Field of Classification Search
CPC . H04W 84/045; H04W 72/082; H04W 72/04; H04W 72/0486; H04W 24/02; H04W 24/10; H04W 84/042; H04W 28/08; H04W 72/0413; H04W 72/06; H04W 72/1215; H04W 72/1252; H04W 72/1273; H04L 5/0044; H04L 5/0037
USPC ... 455/450, 422.1, 446, 447, 11.1, 444, 448, 455/452.1, 522
See application file for complete search history.

(56) References Cited

U.S. PATENT DOCUMENTS

| | | | |
|---|---|---|---|
| 2010/0118827 A1* | 5/2010 | Sundaresan | H04W 72/04 370/330 |
| 2012/0157108 A1* | 6/2012 | Boudreau | H04W 16/32 455/450 |
| 2014/0113644 A1* | 4/2014 | Burchardt | H04L 5/0032 455/452.1 |
| 2015/0009910 A1* | 1/2015 | Ryu | H04W 72/04 370/329 |
| 2015/0092558 A1* | 4/2015 | Prasad | H04W 28/08 370/235 |

(Continued)

*Primary Examiner* — Fred A Casca
(74) *Attorney, Agent, or Firm* — Joseph Kolodka (57) ABSTRACT

Methods and systems for assigning users to nodes include assigning user devices to respective macro nodes in a wireless network. Each of the user devices is assigned to a respective pico node in the wireless network. Each respective pico node is associated with the same macro node that the respective user device is assigned to. Resource allocation fractions are assigned to all pico nodes and all macro nodes in the wireless network based on the assignment of each of the plurality of user devices respective macro nodes and pico nodes.

10 Claims, 6 Drawing Sheets

(56) References Cited

U.S. PATENT DOCUMENTS

| | | | |
|---|---|---|---|
| 2016/0026929 A1* | 1/2016 | Bhattacharjya | G06N 7/005 706/52 |
| 2016/0338030 A1* | 11/2016 | Shnaiwer | H04W 24/02 |
| 2017/0303296 A1* | 10/2017 | Prasad | H04L 5/0082 |
| 2018/0137229 A1* | 5/2018 | Cox | G06F 17/5045 |
| 2018/0198577 A1* | 7/2018 | Prasad | H04L 5/0032 |

* cited by examiner

DUAL CONNECTIVITY IN HETEROGENEOUS CELLULAR NETWORKS

RELATED APPLICATION INFORMATION

This application claims priority to U.S. Provisional Application Ser. No. 62/445,037, filed on Jan. 11, 2017, incorporated herein by reference herein its entirety.

BACKGROUND

Technical Field

The present invention relates to mobile communications and, more particularly, to dual connectivity arrangements where devices maintain connections with multiple nodes in a network.

Description of the Related Art

Traditional wireless networks are converting to heterogeneous networks (HetNets) that do not use the classical structured cell layout. Instead, these HetNets use multiple transmission points (or nodes) ranging from enhanced versions of conventional, high-power macro base-stations to low-power pico nodes, all deployed in an irregular fashion. Low-power nodes are used to cater to emerging hot spots, alleviating the demand on network bottlenecks without being subject to the challenges of acquiring a site suitable for a macro base-station.

One challenge in implementing such a HetNet is a need for coordination among transmission nodes, which becomes more acute as the density of such nodes rises. Furthermore, backhaul links between the nodes is often less than idea. As a result, HetNets may be partitioned into several coordination units or clusters, with each cluster having a set of high-power macro nodes along with a set of low-power pico nodes, each pico node being assigned to one of the macro nodes. Only semi-static (or periodic) coordination among the transmission points in a cluster has been deemed feasible.

SUMMARY

A method for assigning users to nodes includes assigning user devices to respective macro nodes in a wireless network. Each of the user devices is assigned to a respective pico node in the wireless network. Each respective pico node is associated with the same macro node that the respective user device is assigned to. Resource allocation fractions are assigned to all pico nodes and all macro nodes in the wireless network based on the assignment of each of the plurality of user devices respective macro nodes and pico nodes.

A system for assigning users to nodes includes a control module in communication with a set of macro nodes and a set of pico nodes in a wireless network. Each pico node is associated to a respective one of the macro nodes. The control module is further configured to communicate user associations and resource allocation fractions to the macro nodes and the pico nodes. A node association module includes a processor configured to assign user devices to respective macro nodes and to assign each of the user devices to a respective pico node. Each respective pico node is associated with the same macro node that the respective user device is assigned to. An allocation fraction module is configured to assign resource allocation fractions to all pico nodes and all macro nodes based on the assignment of each of the user devices' respective macro nodes and pico nodes.

A method for assigning users to nodes in a wireless network includes assigning a first user to a macro node for a period of time. A set of users that includes the first user is assigned to a pico node for the period of time. At most one user of all users assigned to the pico node has a non-zero resource allocation fraction with the macro node.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Embodiments of the present invention employ provide dual connectivity on heterogeneous networks (HetNets), where a user's device can be associated with both a high-power macro node and a low-power pico node. The user can then simultaneously receive different data from both nodes. The present embodiments efficiently handle user association in a way that is optimal for a proportional fairness system utility up to an additive constant. The user association problem to optimize the weighted sum rate utility, subject to per-user minimum and maximum rate constraints, can be formulated as a constrained, non-monotone, sub-modular set function maximization. The present embodiments thereby provide significant gains through dual connectivity, especially at low network loads.

Figure 1:
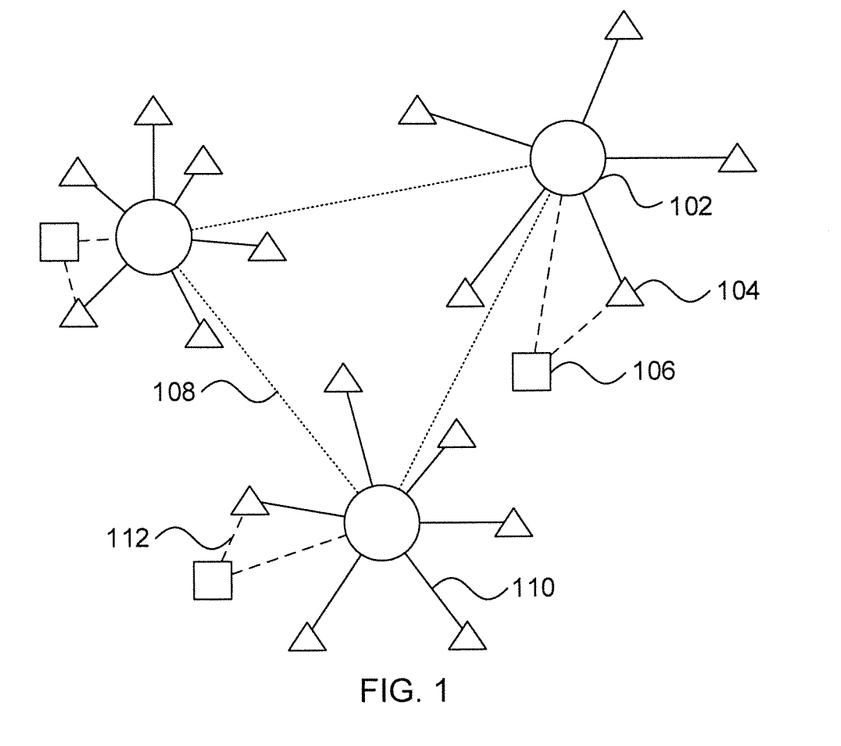
FIG. 1 is a diagram of a wireless network that includes both macro nodes and pico nodes as well as users that are assigned dual connectivity in accordance with an embodiment of the present invention.

Referring now in detail to the figures, in which like numerals represent the same or similar elements, and initially to FIG. 1, a diagram of a HetNet 100 with dual connectivity is illustratively depicted in accordance with one embodiment of the present principles. A set of macro nodes 102, pico nodes 104, and user devices 106 is shown. In general terms, macro-nodes will have a higher transmission power and/or higher-gain antennas and will be able to provide a larger service area than a pico nodes 104. The macro nodes 102 are connected to one another by backhaul links 108 and to pico nodes by fronthaul links 110. Each user device 106 will be connected to a single macro node 102 and a single pico node 104.

Letting U denote the set of user devices 106 with cardinality $|U|=K$, and letting M denote the set of macro nodes 102, for each macro node $m \in M$, $B_m$ is the set of pico nodes 104 assigned to the macro node m. The set $B_m$ of pico nodes 104 helps the associated macro node 102 serve its users 106. The set of pico nodes 104 across all macro nodes 102 can then also be expressed as $P = \cup_{m \in M} B$, with the set of all nodes being $S = M \cup P$. Each user 106 can be associated with one macro node 102 and one pico node 104, where the associated pico node 104 is associated with the same macro node 102.

For each user $u \in U$ and each node $b \in S$, an average peak rate $R_{u,b}$ that a user can receive is defined, measured in bits per unit resource when that user u is the only user being served by the node b. The average peak rate $R_{u,b}$ is a function of the slow fading parameters (such as path loss and shadowing) seen by the user u, but not instantaneous fast-fading effects. The average rate $R_{u,b}$ can furthermore be computed under the assumption that all the other interfering nodes are always transmitting or, alternatively, under the assumption that each interfering node transmits for a given fraction of the frame duration. In some embodiments, macro nodes 102 and pico nodes 104 may share a single spectrum band, while in other embodiments the macro nodes 102 may occupy a first spectrum band and the pico nodes 104 may occupy a second, distinct or partially overlapping spectrum band. The present embodiments apply to both scenarios.

The present embodiments are described with respect to the assumption that $R_{u,b} > 0$, $\forall u \in U, b \in S$. It is also assumed that $$\frac{R_{u,m}}{R_{u,h}} \neq \frac{R_{u',m}}{R_{u',b}},$$

$\forall b \in B_m$, $m \in M, u \neq u'$. These assumptions hold true for nearly all typical slow-fading distributions. This leads to a network utility maximization problem that adopts the weighted sum rate (WSR) utility under per-user rate constraints, which is expressed as equation (1) as follows:

$$\max_{z_{\{u,m\}}, x_{\{u,b\}} \in [0,1], \gamma_{\{u,b\}}, \theta_{\{u,m\}} \in [0,1] \forall u \in U, b \in B_m, m \in M} \left\{ \sum_{u \in U} \sum_{m \in M} \left( w_u R_{\{u,m\}} \theta_{\{u,m\}} + \sum_{b \in B_m} w_u x_{u,b} R_{u,b} \gamma_{u,b} \right) \right\}$$

$$\text{s.t.} \sum_{m \in M} z_{u,m} \leq 1; \sum_{b \in B_m} x_{u,b} = z_{u,m}, \forall u \in U, m \in M;$$

$$\sum_{u \in M} \theta_{u,1} \leq 1 \& \sum_{u \in U} \gamma_{u,b} \leq 1 \forall b \in B_m, m \in M;$$

$$R_{u,m} \theta_{u,m} + \sum_{b \in B_m} x_{(u,b)} R_{u,b} \gamma_{u,b} \in [z_{u,m} R_u^{min}, z_{u,m} R_u^{max}], \forall u \in U$$

where $w_u > 0$, $\forall u \in U$ denotes any input weight or priority assigned to a user u. The binary-valued variable $z_{u,m}$ is a 1 if u is associated to the macro node m and is 0 otherwise, such that the first set of constraints ensures that each user 106 is associated with at least one macro node 104.

Exploiting dual connectivity, each user u that is associated to macro node m is also associated with one pico node in $B_m$. The indicator variable $X_{u,b}$ is 1 if the user u is associated to node b and is 0 otherwise. Thus $\{x_{u,b} = 1\}_{u \in U, b \in B_m}$ yields the set of users that are associated to any node in $B_m$ and to macro node m. The continuous variables $\gamma_{u,b}$ and $\theta_{u,b}$ are allocation fractions, with respective sums that are upper-bounded by unity for each macro node 102 and for each pico node 104. While the utility maximization problem shown above does not enforce that each user must be associated with a node, it does enforce that each user 106 associated to a macro node 102 is assigned at least its minimum rate without exceeding a maximum rate. The former constraint is useful in enforcing that a minimum expected quality of service is provided to each user, while the latter constraint caps the rates of any set of users. It should be noted that the utility maximization problem is always feasible.

Adopting the convention that $0 \cdot \ln 0 = 0$, a proportional fairness system utility provides a mixed optimization problem as equation (2) below:

$$\max_{z_{\{u,m\}}, x_{\{u,b\}} \in [0,1], \gamma_{\{u,b\}}, \theta_{\{u,m\}} \in [0,1] \forall u \in U, b \in B_m, m \in M} \left\{ \sum_{u \in U} \sum_{m \in M} \sum_{b \in B_m} x_{u,b} \ln (R_{\{u,m\}} \theta_{\{u,m\}} + R_{u,b} \gamma_{u,b}) \right\}$$

$$\text{s.t.} \sum_{m \in M} z_{u,m} \leq 1; \sum_{b \in B_m} x_{u,b} = z_{u,m}, \forall u \in U, m \in M;$$

$$\sum_{u \in M} \theta_{u,1} \leq 1 \& \sum_{u \in U} \gamma_{u,b} \leq 1 \forall b \in B_m, m \in M;$$

The constraints in the mixed optimization problem ensure that each user 106 is associated with exactly one macro node 102. Further, exploiting dual connectivity, each user that is associated to the macro node m is also associated to one pico node in $B_m$. This formulation assumes an infinitely backlogged traffic model with no limits on buffer sizes at any node. Coordination happens at frame boundaries where user associations can be altered. After a transient phase (the length of which is ignored herein), for each user, distinct data streams are available for downlink transmission at the assigned macro node 102 and pico node 104.

The present embodiments find optimal allocations of the network utility maximization problem and the mixed optimization problem for any given user association. The network utility maximization problem decouples into $|M|$ subproblems, one of each macro node 102, upon fixing the user association. As a result, it is assumed that the subproblem corresponding to any arbitrary macro node 102 (e.g., m=1) will govern any subset of users $U' \subseteq U$ for that macro node. Then, for each $b \in B_1$, the associated user set is denoted as $U^{(b)} = \{u \in U : x_{u,b} = 1\}$ such that $U^{(b)} \cap U^{(b')} = \phi$, $b \neq b'$, where $\phi$ denotes the empty set and $\cup_{b \in B_1} U^{(b)} = U'$. $B_{1'}$ is the set of all pico nodes 104 in $B_1$ with at least one associated user. A budget constraint is applied for each pico node 104 as $\Gamma_b \in [0,1]$, $\forall b \in B_{1'}$, and for the macro node 102 as $\Gamma \in [0,1]$. The optimal allocation fraction of the network utility maximization problem is then expressed as equation (3) below:

$$\max_{\gamma_{u,1}, \theta_{u,1} \in [0,1] \forall u \in U, b \in B_{1'}} \left\{ \sum_{b \in B_{1'}} \sum_{u \in U^{(b)}} (w_u R_{u,1} \theta_{u,1} + w_u R_{u,b} \gamma_{u,b}) \right\}$$

$$\text{s.t.} \sum_{u \in U} \theta_{u,1} \leq \Gamma \& \sum_{u \in U^{(b)}} \gamma_{u,b} \leq \Gamma_b \forall b \in B'_1;$$

$$R_u \triangleq R_{u,1} \theta_{u,1} + R_{u,b} \gamma_{u,b} \in [R_u^{min}, R_u^{max}], \forall u \in U^{(b)}, b \in B_{1'}$$

This allocation fraction is assumed to be feasible. Without loss of generality, it can also be assumed that each pico node 104 is resources limited such that $$\sum_{u \in U^{(b)}} \frac{R_u^{max}}{R_{u,b}} > \Gamma_b.$$

This is because otherwise a maximum possible resource from the node b could be assigned to each user in $U^{(b)}$. The term "slack" is used herein to denote the resource assigned to a user in excess of its minimum rate requirement. For each user $k \in U^{(b)}$, $b \in B_1$, it is set that $R_k = R_{k,1}\theta_{k,1} + R_{k,b}\gamma_{k,b}$ and the dependence of $R_k$ on $\theta_{k,1}$ and $\gamma_{k,1}$ is suppressed.

The following conditions are to be satisfied by any optimal solution of the allocation fraction of the network utility maximization problem:

For any two distinct users $(k,j \in U^{(b)})$ associated with any node $(b \in B_1)$, such that $$\frac{R_{k,b}}{R_{k,1}} > \frac{R_{j,b}}{R_{j,1}},$$

then $\theta_{k,1} > 0 \Rightarrow \theta_{j,b} = 0$ (4).

For any two distinct users associated with any node $(k,j \in U^{(b)}, b \in B_1)$, such that $w_k R_{k,b} > w_j R_{j,b}$, then $R_j > R_j^{min}$ & $\gamma_{j,b} > 0 \Rightarrow R_k = R_k^{max}$ (5).

For any two distinct users $(k,j \in U')$, such that $w_k R_{k,1} > w_j R_{j,1}$, then $R_j > R_j^{min}$ & $\theta_{j,1} > 0 \Rightarrow R_k = R_k^{max}$ (6).

For any user $(k \in U^{(b)}, b \in B_1)$, such that $\gamma_{k,b} > 0$, if there exists any other user $j \in U'$ with $\theta_{j,1} > 0$ and $R_j > R_j^{min}$, then:

$$\frac{R_{k,b}}{R_{k,1}} \geq \frac{\max_{j \in U^{(b)} \setminus k: R_j < R_j^{max}} \{w_j R_{j,1}\}}{\max_{j \in U' \setminus k: \theta_{j,1} > 0 \,\&\, R_j > R_j^{min}} \{w_j R_{j,1}\}} \quad (7)$$

For any user $(k \in U^{(b)}, b \in B_1)$, such that $\theta_{k,1} > 0$, if there exists any other user $j \in U^{(b)}$ with $\gamma_{j,b} > 0$ and $R_j > R_j^{min}$, then:

$$\frac{R_{k,b}}{R_{k,1}} \geq \frac{\max_{j \in U^{(b)} \setminus k: \gamma_{j,b} > 0 \,\&\, R_j < R_j^{min}} \{w_j R_{j,b}\}}{\max_{j \in U' \setminus k: R_j > R_j^{max}} \{w_j R_{j,1}\}} \quad (8)$$

$\hat{O}(\Gamma, \{\Gamma_b\})$ denotes the optimal value of the allocation fraction for given budgets. In the case where $R_u^{max} > \Gamma R_{u,1} + \Gamma_b R_{u,b}$, $\forall u \in U^{(b)}$, $b \in B_1$, an optimal solution can be determined in a decoupled manner across all nodes. Further, for any non-negative scalars $\delta, \tilde{\delta}, \{\delta_b, \tilde{\delta}_b\}$: $\Gamma + \delta + \tilde{\delta} \leq 1$ & $\Gamma_b + \delta_b + \tilde{\delta}_b \leq 1$, $\forall b \in B_1$, then:

$\hat{O}(\Gamma, \{\Gamma_b\}) - \hat{O}(\Gamma + \delta, \{\Gamma_b + \delta_b\}) \leq \hat{O}(\Gamma + \tilde{\delta}, \{\Gamma_b + \tilde{\delta}_b\}) - \hat{O}(\Gamma + \delta + \tilde{\delta}, \{\Gamma_b + \delta_b + \tilde{\delta}_b\})$ The allocation fraction (3) of the network utility maximization problem (1) can then be solved using this optimal value of allocation fractions. User indices are labeled such that, for any two users $k,j \in U^{(b)}$, for any $b \in B_1$, then $$k < j \Rightarrow \frac{R_{k,b}}{R_{k,1}} \geq \frac{R_{j,b}}{R(j,1)}.$$

Further, without loss of generality, the user indices in $U^{(b)}$ for each $b \in B_1$, are assumed to be consecutive. Upon applying primal decomposition on (3), the formulation decouples into $|B_1|$ subproblems. In particular, the fractional allocation problem for a node b is given by equation (11) below:

$$\max_{\gamma_{u,b}, \theta_{u,1} \in [0,1] \forall u \in U^{(b)}} \left\{ \sum_{u \in U^{(b)}} (w_u R_{u,1} \theta_{u,1} + w_u R_{u,b} \gamma_{u,b}) \right\}$$

$$\text{s.t.} \sum_{u \in U^{(b)}} \theta_{u,1} \leq Z_b \;\&\; \sum_{u \in U^{(b)}} \gamma_{u,b} \leq \Gamma_b$$

$$R_u \in [R_u^{min}, R_u^{max}], \forall u \in U^{(b)}$$

$\hat{O}(Z_b, \Gamma_b, b)$ denotes the optimal solution of this problem for each node $b \in B_1$, so the original problem in (3) can be expressed as:

$$\max_{\{Z_b \in IR_+\} : \sum_{b \in B_1} Z_b \leq \Gamma} \left\{ \sum_{b \in B_1} \hat{O}(Z_b, \Gamma_b, b) \right\}$$

A straightforward approach to determine the optimal macro resource share among the nodes is to optimize $\{Z_b\}$ using the generic subgradient method. However, exploiting the structure of the problem at hand leads directly to a very simple algorithm. First, a function is defined, $\bar{h}: IR_+ \times B_1 \rightarrow IR_+$, such that $\bar{h}(\Gamma_b, b)$ for any given TP b and corresponding budget, $\Gamma_b$, yields the minimum Macro resource needed (in addition to the available budget $\Gamma_b$ for the pico node b) to accommodate the minimum rates of all users in $U^{(b)}$. In particular, $\bar{h}(\Gamma_b, b)$ is explicitly detailed as (13) below:

$$\bar{h}(\Gamma_b, b) = \begin{cases} \frac{R_{\tilde{k}+1}^{min} - \Xi_b R_{\tilde{k}+1,b}}{R_{\tilde{k}+1,1}} + \sum_{j \in U^{(b)}: j > \tilde{k}+1} \frac{R_j^{min}}{R_{j,1}}, & \tilde{k}+1 \in U^{(b)} \\ 0, & \text{Else} \end{cases}$$

$$\tilde{k} = \max\left\{k : k \in U^{(b)} \;\&\; \sum_{j \in U^{(b)}: j \leq k} \frac{R_j^{min}}{R_{j,b}} \leq \Gamma_b\right\},$$

$$\Xi_b = \Gamma_b - \sum_{j \in U^{(b)}: j \leq \tilde{k}} \frac{R_j^{min}}{R_{j,b}}$$

By convention, $\tilde{k}+1$ returns the user with the lowest index in $U^{(b)}$ whenever $\tilde{k}$ is null on account of $$\sum_{j \in U^{(b)}: j \leq k} \frac{R_j^{min}}{R_{j,b}} \leq \Gamma_b$$

for all $k \in U^{(b)}$. In a similar manner, $\underline{h}: IR_+ \times B_1 \rightarrow IR_+$ is defined, such that $\underline{h}(Z_b, b)$ for any given node b and a given Macro budget, $Z_b$, yields the additional minimum resource needed by node b to accommodate the minimum rates of all users in $U^{(b)}$. $\underline{h}(Z_b, b)$ can be explicitly written as (14) below:

$$\underline{h}(Z_b, b) = \begin{cases} \frac{R_{\tilde{k}-1}^{min} - \check{Z}_b R_{\tilde{k}-1,1}}{R_{\tilde{k}-1,b}} + \sum_{j \in U^{(b)}: j < \tilde{k}-1} \frac{R_j^{min}}{R_{j,b}}, & \tilde{k} - 1 \in U^{(b)} \\ 0, & \text{Else} \end{cases}$$

$$\tilde{k} = \min\left\{k: k \in U^{(b)} \; \& \; \sum_{j \in U^{(b)}: j \geq k} \frac{R_j^{min}}{R_{j,1}} \leq Z_b\right\},$$

$$\check{Z}_b = Z_b - \sum_{j \in U^{(b)}: j \geq \tilde{k}} \frac{R_j^{min}}{R_{j,1}}$$

For any given $\Gamma_b$, $S(Z_b,\Gamma_b,b)$, $b \in B_1$, $Z_b \geq \overline{h}(F_b,b)$ denotes the slope of the function $\hat{O}(Z_b,\Gamma_b,b)$ at $Z_b$. It will be assumed that $\underline{h}(1,b) \leq 1$ & $\overline{h}(1,b) \leq 1$, $\forall b \in B_1$. The slope can be expressed as (15) below:

$$S(Z_b, \Gamma_b, b) = \lim_{\delta \to 0_+} \frac{\hat{O}(Z_b + \delta, \Gamma_b, b) - \hat{O}(Z_b, \Gamma_b, b)}{\delta}$$

For any fixed $\Gamma_b \geq \underline{h}(1,b)$, $\hat{O}(Z_b,\Gamma_b,b)$ is continuous, non-decreasing, piecewise linear and concave in $Z_b \in [\overline{h}(\Gamma_b,b),1]$. For any fixed $Z_b \geq \overline{h}(1,b)$, $\hat{O}(Z_b,\Gamma_b,b)$ is continuous, non-decreasing, piecewise linear and concave in $\Gamma_b \in [\underline{h}(Z_b,b),1]$. For any fixed $\Gamma_b > \underline{h}(1,b)$, $\hat{O}(Z_b,\Gamma_b,b)$ can be computed as (16) below:

$$\hat{O}(Z_b, \Gamma_b, b) = \sum_{k \in U^{(b)}} R_k^{min} + H(\Gamma_b, b) + \int_{\overline{h}(\Gamma_b,b)}^{Z_b} S(z_b, \Gamma_b, b) dz_b,$$

$$\forall Z_b \in [\overline{h}(\Gamma_b, b), 1],$$

where $H(\Gamma_b,b)=0$ whenever $\overline{h}(\Gamma_b,b)>0$, and when $\overline{h}(\Gamma_b,b)=0$, it yields the weighted sum rate obtained by distributing the excess pico resource as slack among users in $U^{(b)}$ in the decreasing order $\{w_k R_{k,b}\}$ subject to their respective maximum rate limits.

Figure 2:
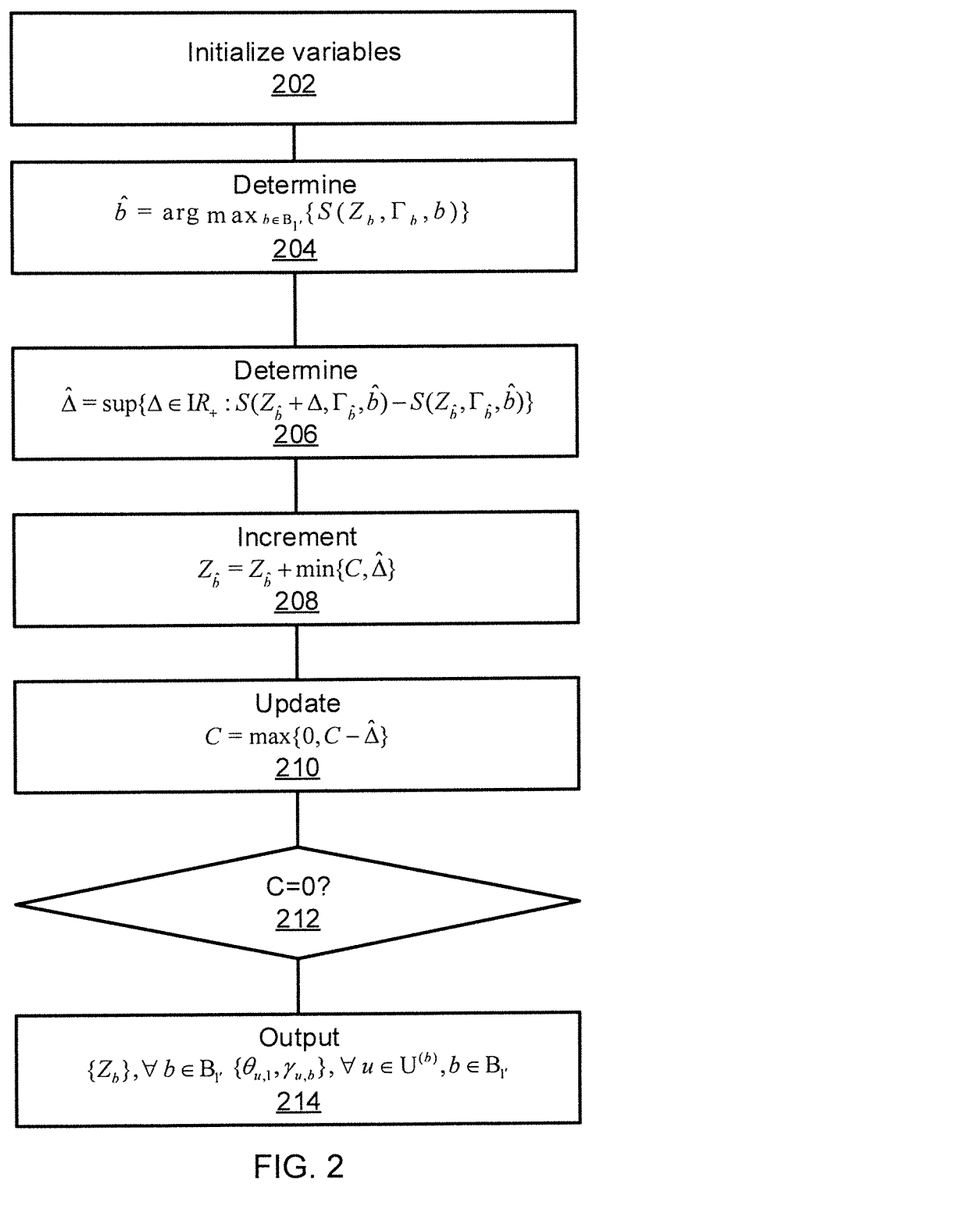
FIG. 2 is a block/flow diagram of a method for making optimal allocation fractions in accordance with an embodiment of the present invention.

Referring now to FIG. 2, a method for making optimal WSR allocation fractions is shown. Block 202 initializes variables, with $B_1$, $U_{(b)}$, $b \in B_1$, $Z_b = \overline{h}(\Gamma_b,b)$, $\forall b \in B_1$, and $C = \Gamma - \Sigma_{b \in B_1} Z_b$. Block 204 determines a value for $\hat{b} = \arg\max_{b \in B_1} \{S(Z_b,\Gamma_b,b)\}$ and block 206 determines a value for $\hat{\Delta} = \sup\{\Delta \in \mathbb{R}_+: S(Z_{\hat{b}}+\Delta,\Gamma_{\hat{b}},\hat{b}) = S(Z_{\hat{b}},\Gamma_{\hat{b}},\hat{b})\}$. Block 208 increments $Z_{\hat{b}} = Z_{\hat{b}} + \min\{C,\hat{\Delta}\}$ and block 210 updates $C = \max\{0, C - \hat{\Delta}\}$.

Block 212 determines whether the updated value for C is equal to zero. If not, processing returns to block 204. If so, block 214 outputs $\{Z_b\}, \forall b \in B_1$ and the corresponding allocation fractions $\{\theta_{u,1}, \gamma_{u,b}\}, \forall u \in U^{(b)}, b \in B_1$.

The optimal solution to (3) can be determined using this method whenever the necessary and sufficient condition for feasibility, $\Sigma_{b \in B} \overline{h}(\Gamma_b,b) \leq 1$, holds. For any fixed budgets $\{\Gamma_b\} \forall b \in B_1$, satisfying the feasibility condition, $\hat{O}(\Gamma,\{\Gamma_b\})$ is continuous, non-decreasing, piecewise linear and concave in $\Gamma \in [\Sigma_{b \in B_1} \overline{h}(\Gamma_b,b),1]$.

The present embodiments maximize $|B_1|$ piecewise linear concave functions subject to a linear budget constraint. The method of FIG. 2 selects the highest slope and assigns it as much resource as possible until the point that the maximal slope changes. This greedy strategy is optimal for the problem at hand because: (i) each slope curve $S(Z_b,\Gamma_b,b)$, $Z_b \geq \overline{h}(\Gamma_b,b)$ is a piecewise constant function in $Z_b$ and (ii) any Macro resource assigned to any node b' has no influence on the slope curve of any other node $b \neq b'$, $b \in B_1$. More formally, (12) can be shown to be equivalent to the maximization of a modular function subject to a cardinality constraint for which the greedy strategy is optimal. Next, the claimed properties of $\hat{O}(\Gamma,\{\Gamma_b\})$ directly follow from the fact that in (12) each $\hat{O}(Z_b,\Gamma_b,b)$ is continuous, non-decreasing, piecewise linear, and concave in $Z_b$. Let $G=[\Gamma_b]_{b \in B_1}$ denote any vector of all pico budgets and let $S(Z,G)$ denote the slope curve of $\hat{O}(Z,G) = \hat{O}(Z,\{\Gamma_b\})$ for $Z \geq \Sigma_{b \in B_1}(\Gamma_b,b)$, which is piecewise constant and non-increasing in Z. (17) below is the result:

$$\hat{O}(\Gamma, G) = \sum_{b \in B_1} \sum_{k \in U^{(b)}} R_k^{min} + \sum_{b \in B_1} H(\Gamma_b, b) + \int_{\Sigma_{b \in B_1} \overline{h}(\Gamma_b,b)}^{Z} S(z, G) dz,$$

$$\forall Z \in \left[\sum_{b \in B_1} \overline{h}(\Gamma_b, b), 1\right].$$

For any two pico nodes $b_1, b_2 \in B_1$, the vectors $e_{b_1}, e_{b_2}$ define $|B_1| \times 1$ unit vectors that have a zero on all their entries except the ones corresponding to $b_1$, $b_2$, respectively, which are both one. For any non-negative scalars $\delta, \tilde{\delta}, \delta_{b_1}, \delta_{b_2}$, and budgets $\Gamma$, $G$ such that $\Gamma \geq \Sigma_{b \in B_1} \overline{h}(\Gamma_b,b)$, (18) below holds:

$$\hat{O}(\Gamma,G) - \hat{O}(\Gamma+\delta, G+\delta_{b_1}e_{b_1}) \leq \hat{O}(\Gamma+\tilde{\delta}, G+\delta_{b_2}e_{b_2}) - \hat{O}(\Gamma+\tilde{\delta}+\delta, G+\delta_{b_1}e_{b_1}+\delta_{b_2}e_{b_2})$$

Furthermore, for any node b with a budget $\Gamma_b \leq 1$ and any scalar $\delta_b \leq \Gamma_b$:

$$S(Z_b,\Gamma_b,b) \leq S(Z_b,\Gamma_b-\delta_b,b), \forall Z_b \geq \overline{h}(\Gamma_b-\delta_b,b)$$

Thus for any $\tilde{\delta}_b: \overline{h}(\Gamma_b-\delta_b-\tilde{\delta}_b, b) \leq 1$:

$$\hat{O}(Z_b,\Gamma_b-\delta_b,b) - \hat{O}(Z_b,\Gamma_b-\delta_b-\tilde{\delta}_b,b) = H(\Gamma_b-\delta_b,b) - H(\Gamma_b-\delta_b-\tilde{\delta}_b,b) + \int_{\overline{h}(\Gamma_b-\delta_b,b)}^{Z_b} S(z_b,\Gamma_b-\delta_b,b)dz_b - \int_{\overline{h}(\Gamma_b-\delta_b-\tilde{\delta}_b,b)}^{Z_b} S(z_b,\Gamma_b-\delta_b-\tilde{\delta}_b,b)dz_b, \forall Z_b \in [\overline{h}(\Gamma_b-\delta_b-\tilde{\delta}_b,b),1]$$

where for any fixed $Z_b,\Gamma_b,\tilde{\delta}_b$, the difference $\hat{O}(Z_b,\Gamma_b-\delta_b,b) - \hat{O}(Z_b,\Gamma_b-\delta_b-\tilde{\delta}_b,b)$ is non-decreasing in $\delta_b$. For any fixed $\Gamma_b$, $\tilde{\delta}_b$, the difference $\overline{h}(\Gamma_b-\delta_b-\tilde{\delta}_b,b) - \overline{h}(\Gamma_b-\delta_b,b)$ is also non-decreasing in $\delta_b$. Further, $S(\overline{h}(\Gamma_b-\delta_b,b),\Gamma_b-\delta_b,b)$ is non-increasing in $\delta_b: \overline{h}(\Gamma_b-\delta_b,b)>0$, whereas $\int_{\overline{h}(\Gamma_b-\delta_b-\tilde{\delta}_b,b)}^{\overline{h}(\Gamma_b-\delta_b,b)} S(z_b,\Gamma_b-\delta_b,b)dz_b$ is non-decreasing in $\delta_b$.

As a result, more macro resources are needed when the available pico resource is reduced by $\tilde{\delta}_b$, beginning with a smaller value of available pico resources $\Gamma_b - \delta_b$ instead of $\Gamma_b$. This is because minimum rates of users with progressively smaller indices $k \in U^{(b)}$ have to be accommodated by the macro node. These users have larger rations $$\frac{R_{k,b}}{R_{k,l}},$$

which means that rate loss resulting from a reduction in the pico resource has to be compensated by a relatively larger macro allocation.

As before, the sets $U', B_1$ are obtained from the given association, with $N_b = |U^{(b)}|$ denoting the cardinality or the number of users associated with node $b \in B_1$. The proportional fairness system utility optimization problem (restricted to the user pool U') for the given user association is given as (19) below:

$$\max_{\gamma_{y,b},\theta_{u,1}\in[0,1]\forall u\in U',b\in B_{1'}} \left\{ \sum_{u\in U'}\sum_{b\in B_{1'}} x_{u,b}\ln(R_{u,1}\theta_{u,1}+R_{u,b}\gamma_{u,b}) \right\}$$

$$\text{s.t.} \sum_{u\in U'}\theta_{u,1}\leq 1 \ \& \ \sum_{u\in U'}\gamma_{u,b}\leq 1 \forall\ b\in B_{1'}$$

Note that this optimization problem is purely continuous. For each $b\in B_{1'}$ define $$\mu_{1,b} = \min_{u\in U^{(b)}}\left\{\frac{R_{u,1}}{R_{u,b}}\right\}.$$

Similarly, let $\mu_{k,b}, k\in\{2,\ldots,N_b\}$ denote the $k^{th}$ smallest ratio in the set $$\left\{\frac{R_{u,1}}{R_{u,b}}\right\}_{u\in U^{(b)}}.$$

These ratios are all strictly positive and distinct. Then, defining $\mu_{N_b+1,b}=\infty$ results in $0<\mu_{1,b}<\mu_{2,b}<\ldots<\mu_{N_b,b}<\mu_{N_b+1,b}=\infty$. A function $h:\mathrm{IR}_{++}\times B_{1'}\to\mathrm{IR}_+$ is defined as (20) below:

$$h(\lambda,b) = \begin{cases} \dfrac{1}{\mu_{m,b}}, & m=1,\ldots,N_b:\lambda\in((m-1)\mu_{m,b},m\mu_{m,b}) \\ \dfrac{m-1}{\lambda}, & m=2,\ldots,N_b+1:\lambda\in[(m-1)\mu_{m-1,b},(m-1)\mu_{m,b}] \end{cases}$$

Another function $g:\mathrm{IR}_{++}\times B_{1'}\to\mathrm{IR}_+$ is defined such that $g(\lambda,b), \forall\lambda>0, b\in B'_1$ equals (21) below:

$$\begin{cases} \sum_{j=m}^{N_b}\ln(\mu_{j,b}/\lambda)+(m-1)\ln(\mu_{m,b}/\lambda), & m=1,\ldots,N_b:\lambda\in((m-1)\mu_{m,b},m\mu_{m,b}) \\ -(m-1)\ln(m-1)+\sum_{q=m}^{N_b}\ln(\mu_{q,b}/\lambda), & m=2,\ldots,N_b+1:\lambda\in[(m-1)\mu_{m,b},(m-1)\mu_{m,b}] \end{cases}$$

The optimal objective value of the proportional fairness system utility optimization problem (19) is given by (22) below:

$$\sum_{b\in B_{1'}}\left(g(\hat{\lambda},b)+\sum_{k\in U^{(b)}}\ln(R_{k,b})\right),$$

where $\hat{\lambda}\in(0,\infty)$ is the unique solution to the relation (23) below:

$$1+\sum_{b\in B_{1'}}h(\lambda,b) = \sum_{b\in B_{1'}}N_b/\lambda,$$

which can be determined via bisection search.

Given an optimal value of $\hat{\lambda}$, if $\hat{\lambda}\in((m-1)\mu_{m,b},m\mu_{m,b})$ for some $m=1,\ldots,N_b$, the optimal solution assigns an identical resource share $\gamma_{k,b}=\mu_{m,b}/\hat{\lambda}$ with $\theta_{k,1}=0$ for all users $$k\in U^{(b)}:\frac{R_{k,1}}{R_{k,b}}<\mu_{m,b},$$

whereas all users $$k\in U^{(b)}:\frac{R_{k,1}}{R_{k,b}}>\mu_{m,b}$$

are assigned $\theta_{k,1}=1/\hat{\lambda}$ with $\gamma_{k,b}=0$. The user $$k\in U^{(b)}:\frac{R_{k,1}}{R_{k,b}}=\mu_{m,b}$$

is assigned $\theta_{k,1}=m/\hat{\lambda}-1/\mu_{m,b}$ with $\gamma_{k,b}=1-(m-1)\mu_{m,b}/\hat{\lambda}$. On the other hand, if $\hat{\lambda}\in[(m-1)\mu_{m-1,b},(m-1)\mu_{m,b}]$ for some $m=2,\ldots,N_b+1$, the optimal solution assigns an identical resource share $\gamma_{k,b}=1/(m-1)$ with $\theta_{k,1}=0$ for all users $$k\in U^{(b)}:\frac{R_{k,1}}{R_{k,b}}<\mu_{m,b},$$

whereas all users $$k\in U^{(b)}:\frac{R_{k,1}}{R_{k,b}}\geq\mu_{m,b}$$

are assigned $\theta_{k,1}=1/\hat{\lambda}$ with $\gamma_{k,b}=0$.

The proportional fairness system utility optimization problem (19) is a convex optimization problem for which the Karush-Kuhn-Tucker (K.K.T.) conditions are both necessary and sufficient. The K.K.T. conditions include (24) below:

$$\frac{R_{u,1}}{R_{u,1}\theta_{u,1}+R_{u,b}\gamma_{u,b}}+\eta_{u,1}=\lambda,$$

$$\frac{R_{u,b}}{R_{u,1}\theta_{u,1}+R_{u,b}\gamma_{u,b}}+\vartheta_{u,b}=\beta_b, \forall\ u\in U^{(b)}, b\in B_1$$

along with the complementary slackness conditions $\eta_{u,1}\theta_{u,1}=0, \vartheta_{u,b}\gamma_{u,b}=0, \forall u\in U^{(b)}, b\in B_{1'}$, and $(1-\Sigma_{u\in U^{(b)}}\theta_{u,1})\lambda=0$, $(1-\Sigma_{u\in U^{(b)}}\gamma_{u,b})\beta_b=0, \forall b\in B_{1'}$, and the feasibility ones $\theta_{u,1},\gamma_{u,b}\in[0,1], \forall u,b, \Sigma_{u\in U}\theta_{u,1}\leq\Sigma_{u\in U^{(b)}}\gamma_{u,b}\leq 1, \forall b$. Note that $\lambda,\{\beta_b\},\{\eta_{u,1}\},\{\vartheta_{u,b}\}$ are non-negative Lagrangian variables. Manipulating the first two K.K.T conditions along with the complementary slackness conditions shows that, for any two distinct users $u, u'\in U^{(b)}$:

$$\theta_{u,1}\gamma_{u,b} > 0 \ \& \ \theta_{u',1}\gamma_{u',b} > 0 \Rightarrow \frac{R_{u,1}}{R_{u,b}} = \frac{R_{u',1}}{R_{u',b}},$$

which is a contradiction.

Consequently, there can be at-most one user $u \in U^{(b)}$ in each $b \in B_1$, for which $\theta_{u,1}\gamma_{u,b} > 0$. From the remaining conditions, it can be shown that:

$$\theta_{u,1} = 0 \Rightarrow \gamma_{u,b} = \frac{1}{\beta_b} \ \& \ \frac{R_{u,1}}{R_{u,b}} \leq \frac{\lambda}{\beta_b}$$

$$\gamma_{u,b} = 0 \Rightarrow \theta_{u,1} = \frac{1}{\lambda} \ \& \ \frac{R_{u,1}}{R_{u,b}} \geq \frac{\lambda}{\beta_b}$$

An optimal solution fully uses the available resource so that $\Sigma_{u \in U}\theta_{u,1}=1$ and $\Sigma_{u \in U^{(b)}}\gamma_{u,b}=1$, $\forall b \in B_{1'}$. For each $b \in B_{1'}$, the scalars $\mu_{m,b}$, $m=1, \ldots, N_b$ are determined by sorting the set of ratios $$\left\{\frac{R_{u,1}}{R_{u,b}}\right\}_{u \in U^{(b)}}$$

in increasing order. Then, the set $\underline{S}_b^A = \cup_{m=1, \ldots, N_b}((m-1)\mu_{m,b}, m\mu_{m,b})$ is defined along with $\underline{S}_b^B = \cup_{m=2, \ldots, N_b+1}[(m-1)\mu_{m-1,b},(m-1)\mu_{m,b}]$, which together partition the set of positive real numbers into two non-overlapping parts. Note that if $\lambda \in \underline{S}_b^A$, then the only solution to the K.K.T conditions pertaining to node $b$ must have exactly one user $k \in U^{(b)}$ with $\theta_{k,1}\gamma_{k,b} > 0$ and this user must be the one which has the $m^{th}$ smallest ratio $\mu_{m,b}$, where $m \in \{1, \ldots, N_b\}: \lambda \in ((m-1)\mu_{m,b}, m\mu_{m,b})$.

Each user $u$ having a corresponding ratio $$\frac{R_{u,1}}{R_{u,b}}$$

that is smaller than $\mu_{m,b}$ is assigned resource only in node $b$ whereas each user $u$ having a corresponding ratio $$\frac{R_{u,1}}{R_{u,b}}$$

that is greater than $\mu_{m,b}$ is assigned resource only by the Macro. In this case, the total load imposed by users associated to TP $b$ on the Macro is given by $$\frac{N_b}{\lambda} - \frac{1}{\mu_{m,b}}.$$

Similarly, whenever $\lambda \in \underline{S}_b^B$, then the only solution to the K.K.T conditions pertaining to node $b$ has an orthogonal split of associated users in that each user associated to TP $b$ is assigned resource either by the Macro or by TP $b$. In particular, when $\lambda \in [(m-1)\mu_{m-1,b},(m-1)\mu_{m,b}]$ for some $m = 2, \ldots, N_b+1$, then each user $u$ having a corresponding ratio $$\frac{R_{u,1}}{R_{u,b}}$$

that is smaller than $\mu_{m,b}$ is assigned resources only in node $b$, whereas each user $u$ having a corresponding ratio $$\frac{R_{u,1}}{R_{u,b}}$$

that is equal or greater than $\mu_{m,b}$ is assigned resources only by the macro node. The total load imposed by users associated to node $b$ on the macro node in this case is given by $$\frac{N_b}{\lambda} - \frac{m-1}{\lambda}.$$

As a result, regardless of whether $\lambda \in \underline{S}_b^A$ or $\lambda \in \underline{S}_b^B$, upon increasing (decreasing) $\lambda$, the total load imposed on the macro node by users of node $b$ decreases (increases), which establishes that the unique $\lambda$ that fully uses all the Macro resource can be determined using bi-section search to solve the relation in (23) above.

An objective value for the proportional fairness system utility optimization problem (19) that is no less than the optimal value of (19) minus $\min\{|B'_1|,|U'|\} \ln(2)$ can be determined from (25) below, where $\{x_{u,b}\}_{u \in U', b \in B'_1}$ is given:

$$\max_{z_{u,1} \in [0,1] \forall u \in U'} \left\{ \sum_{u \in U'} \left( \tilde{z}_{u,1} \ln(r_{u,1}) + \sum_{b \in B_{1'}} (1 - \tilde{z}_{u,1}) x_{u,b} \ln(R_{u,b}) \right) - \left( \sum_{k \in U'} \tilde{z}_{k,1} \right) \right.$$
$$\left. \ln\left(\sum_{k \in U'} \tilde{z}_{k,1}\right) + \sum_{b \in B_{1'}} \left( \sum_{k \in U'} (1 - \tilde{z}_{k,1}) x_{k,b} \right) \ln\left( \sum_{k \in U'} (1 - \tilde{z}_{k,1}) x_{k,b} \right) \right\}$$

The solution to (25) is equivalent to (19) with the additional restriction that $\theta_{u,1}\gamma_{u,b}=0, \forall u \in U^{(b)}, b \in B'_1$. In an optimal solution of (19), for each node $b \in B'_1$, at most one user in $U^{(b)}$ is assigned resources by both the macro node and pico node $b$. The remaining users in $U^{(b)}$ are all assigned resource by either the macro node or by pico node $b$. If that user is $\hat{u}_b$, which is assigned resource $\hat{\theta}_{\hat{u}_b,1}$ by the macro and resource $\hat{\gamma}_{\hat{u}_b,b}$ by pico node $b$, then for that user the rate is bounded as:

$$\ln(R_{\hat{u}_b,1}\hat{\theta}_{\hat{u}_b,1} + R_{\hat{u}_b,b}\hat{\gamma}_{\hat{u}_b,b}) \leq \ln(2) + \max\{\ln(R_{\hat{u}_b,1}\theta_{\hat{u}_b,1}), \ln(R_{\hat{u}_b,b}\gamma_{\hat{u}_b,b})\},$$

Considering all nodes in $B_{1'}$, the desired result is achieved.

Approximation methods for the optimization problems in (1) and (2) are now possible. Beginning with WSR maximization in (1), a ground set is defined as $\underline{\Omega} = \{(u,b), u \in U, b \in P\}$ where $(u,b)$ conveys the association of a user $u$ with pico node $b$. The tuple also implicitly indicates the association of $u$ to the macro node $m$, where $p \in B_m$. Without loss of generality, only a tuple $(u,b)$ for any $u \in U$ & $b \in B_m, m \in M$ for which $R_{u,m} + R_{u,b} \geq R_u^{min}$ is included in $\underline{\Omega}$. This is because any tuple not satisfying this assumption will never be selected as its minimum rate cannot be met even when the assigned macro and the pico nodes fully allocate their resources to that user. Let $\underline{\Omega}^{(m)} = \{(u,b) \in \underline{\Omega}: b \in B_m\}$ denote all possible associations to any pico node in $B_m$, the set of pico nodes assigned to macro node $m$, and let $\underline{\Omega}_{(u')}=\{(u,b)\in\underline{\Omega}:u=u'\}$ denote all possible associations of a user $u'\in U$. Define a family of sets $\underline{I}$ as the one which includes each subset of $\underline{\Omega}$ such that the tuples in that subset have mutually distinct users. This is formally stated as (26) below:

$$\underline{A}\subseteq\underline{\Omega}:|\underline{A}\cap\underline{\Omega}_{(u)}|\leq 1\,\forall u\in U \Leftrightarrow \underline{A}\in \underline{I}.$$

Further, a family, $\underline{J}$, is defined as being contained in $\underline{I}$ that comprises of each member of $\underline{I}$ for which (1) is feasible. Using the definitions given in the appendix, while $\underline{I}$ defines a matroid, $\underline{J}$ is a downward closed family but need not satisfy the exchange property and hence need not define a matroid. Next, a non-negative set function is defined on $\underline{J}$, $f^{wsr}$: $\underline{J}\rightarrow IR_+$ such that it is normalized, i.e., $f(\phi)=0$. Then for any non-empty set $\underline{G}\in \underline{J}$, the relation (27) below holds:

$$f^{wsr}(\underline{G}) = \sum_{m\in M} f_m^{wsr}(\underline{G}\cap \underline{\Omega}^{(m)}).$$

Each $f_m^{wsr}:\underline{J}^{(m)}\rightarrow IR_+$ in (27) is a normalized non-negative set function that is defined on the family $\underline{J}^{(m)}$ which includes each member of $\underline{J}$ that is contained in $\underline{\Omega}^{(m)}$, as follows. For any set $\underline{A}\in \underline{J}^{(m)}$, it is defined that $f_m^{wsr}(\underline{A})=\hat{O}(1,1)$, where $\hat{O}(1,1)$ is computed as described in FIG. 2 above for the macro node m and the set of pico nodes $B_m$ assigned to it, using unit budgets and the given association in $\underline{A}$. A simple necessary-and-sufficient condition to determine feasibility of the minimum rates for the given association and budgets is provided in above. The problem in (1) can then be reformulated as the following constrained set function maximization problem (28) below:

$$\max_{\underline{G}\in \underline{J}}\{f^{wsr}(\underline{G})\}$$

The set function $f^{wsr}(.)$ is a normalized non-negative submodular set function and can be non-monotone. The set function $f^{wsr}(.)$ in (27) defined on the family $\underline{J}$ is normalized and non-negative by construction. Due to the presence of minimum rate limits in (1) this function need not be monotone, i.e., there can exist members $A,B\in \underline{J}:A\subseteq B$ for which $f^{wsr}(A)>f^{wsr}(B)$. Simultaneously, there can exist members $A', B'\in \underline{J}:A'\subseteq B'$ for which $f^{wsr}(A')\leq f^{wsr}(B')$. Then, to establish submodularity of $f^{wsr}(.)$ on the family $\underline{J}$, it suffices to show that each $f_m^{wsr}(.)$ is submodular on the family $\underline{J}^{(m)}$.

Figure 3:
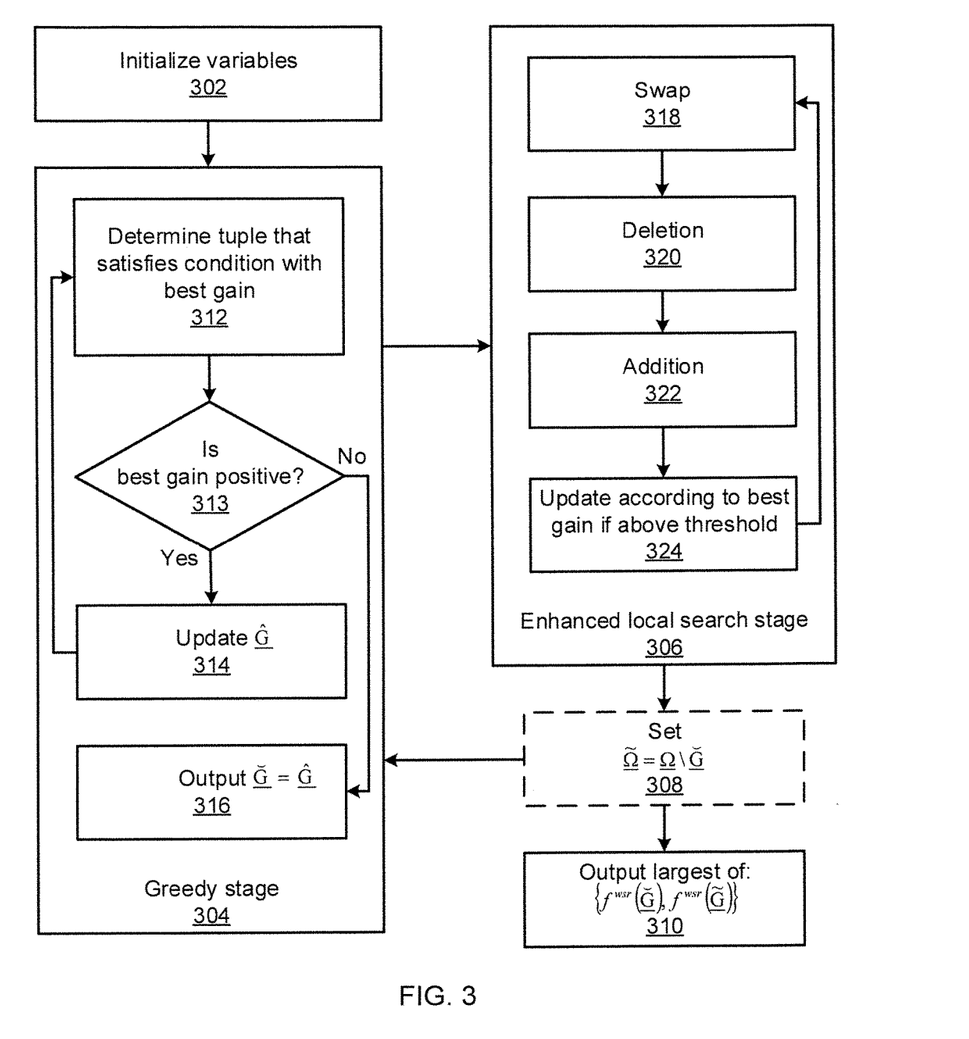
FIG. 3 is a block/flow diagram of a method for a greedy plus enhanced local search method in accordance with an embodiment of the present invention.

Referring now to FIG. 3, a method for optimizing (1) is shown and is referred to as the Greedy plus Enhanced Local Search (GELS) method and optimizes (1). This method builds a set using a greedy stage. The set is then further refined in the enhanced local search stage that includes addition, deletion, and swap operations.

Block 302 initializes the variables including a maximum number of local search iterations, $\underline{\breve{\Omega}}=\underline{\Omega}$, $\Delta>0$, and $\hat{G}=\phi$. Block 304 performs the greedy stage, outputting an updated set $\breve{G}$. Block 306 performs the enhanced local search stage and repeats until either the maximum number of iterations is reached or the overall best gain that is determined is less than a threshold, outputting updated set $\breve{G}$. Block 308 sets $\underline{\breve{\Omega}}=\underline{\Omega}\backslash\breve{G}$ on the first run and the greedy stage 304 and the local search stage 306 are repeated, generating a second output $\breve{G}$. Block 310 outputs the largest of $\{f^{wsr}(\hat{G}), f^{wsr}(\breve{G})\}$.

The greedy stage 304 begins by determining a tuple (k', b') in $\breve{Q}\backslash\hat{G}$ which satisfies $\hat{G}\cup(k',b')\in \underline{J}$ and offers the best gain $f^{wsr}(\hat{G}\cup(k',n'))-f^{wsr}(\hat{G}))$ among all such tuples. If the best gain is positive according to block 313, block 314 updates $\hat{G}\cup(k',n')$ and processing returns to block 312. If the best gain is not positive, then block 316 provides an output $\overline{G}=\hat{G}$.

The enhanced local search stage 306 begins by finding a pair of tuples: (k', b')$\in\breve{G}$ and (k,b)$\in\breve{G}$ in block 318 such that the swapping of (k', b') with (k,b) is in $\underline{J}$ and results in the best gain among such swaps. Block 320 then finds a tuple (k', b')$\in\breve{G}$ such that deleting the tuple results in the best gain among such deletions. Block 322 finds a tuple (k',b')$\in\underline{\breve{\Omega}}\backslash\breve{G}$ such that $\breve{G}\cup(k', b')\in \underline{J}$ and adding the tuple results in the best gain among such additions.

Block 324 determines the overall best gain between the determined swap operation, the determined deletion operation, and the determined addition operation of blocks 318, 320, and 322 respectively. Block 324 computes a threshold $\Delta f^{wsr}(\breve{G})$, which may be a predefined function based on system parameters that controls the speed of convergence and which may be empirically determined. If the overall best gain is at least as large as the threshold, then block 324 updates $\breve{G}$ according to the overall best choice. Block 306 repeats the local search process until the best gain is less than the threshold or until a maximum number of iterations is reached.

The final choice in block 310 yields the larger weighted sum rate utility. It should be noted that this process is subject to an admission control assumption where each member of $\underline{I}$ is also feasible so that $\underline{J}=\underline{I}$. Further, the union of any two members of $\underline{I}$ is also feasible so that collection of feasible sets is expanded. A sufficient condition for this assumption to be true is to ensure that each macro node m$\in$M can itself simultaneously meet twice the minimum rates of all users u that are present in at-least one tuple (u,b)$\in\underline{\Omega}$ for any b$\in B_m$. It should be noted that the admission control assumption is only used to derive a performance guarantee and is not needed to implement the process.

Assuming that the process of FIG. 3 is initialized with an infinite number of iterations in block 306 and $$\Delta = \frac{\epsilon}{C},$$

where $\epsilon>0$ and C is a constant that depends on the size of $\underline{\Omega}$, then the process of FIG. 3 yields a constant factor $$\left(\frac{1}{4+\epsilon}\right)$$

approximation to the solution to (1) over all input instances for which the admission control assumption holds. In the absence of per-user minimum rate constraints, the problem (1) reduces to the monotone submodular maximization problem with a matroid constant, for which the greedy stage output itself yields an approximation factor of ½. In the worst case, the process of FIG. 3 scales polynomially in $|\underline{\Omega}|/\epsilon$. In practice, however, after the greedy stage initialization the local search stage converges very quickly.

Regarding the proportional fairness system utility in (2), an approximation considers problem (29) below:

$$\max_{x_{u,b} \in \{0,1\} \forall u \in U, b \in S} \left\{ \sum_{u \in U} \sum_{b \in S} x_{u,b} \ln(R_{u,b}) - \sum_{b \in S} \left( \sum_{k \in U} x_{k,b} \right) \ln \left( \sum_{k \in U} x_{k,b} \right) \right\}$$

$$\text{s.t.} \sum_{b \in S} x_{u,b} = 1, \forall u \in U$$

Figure 4:
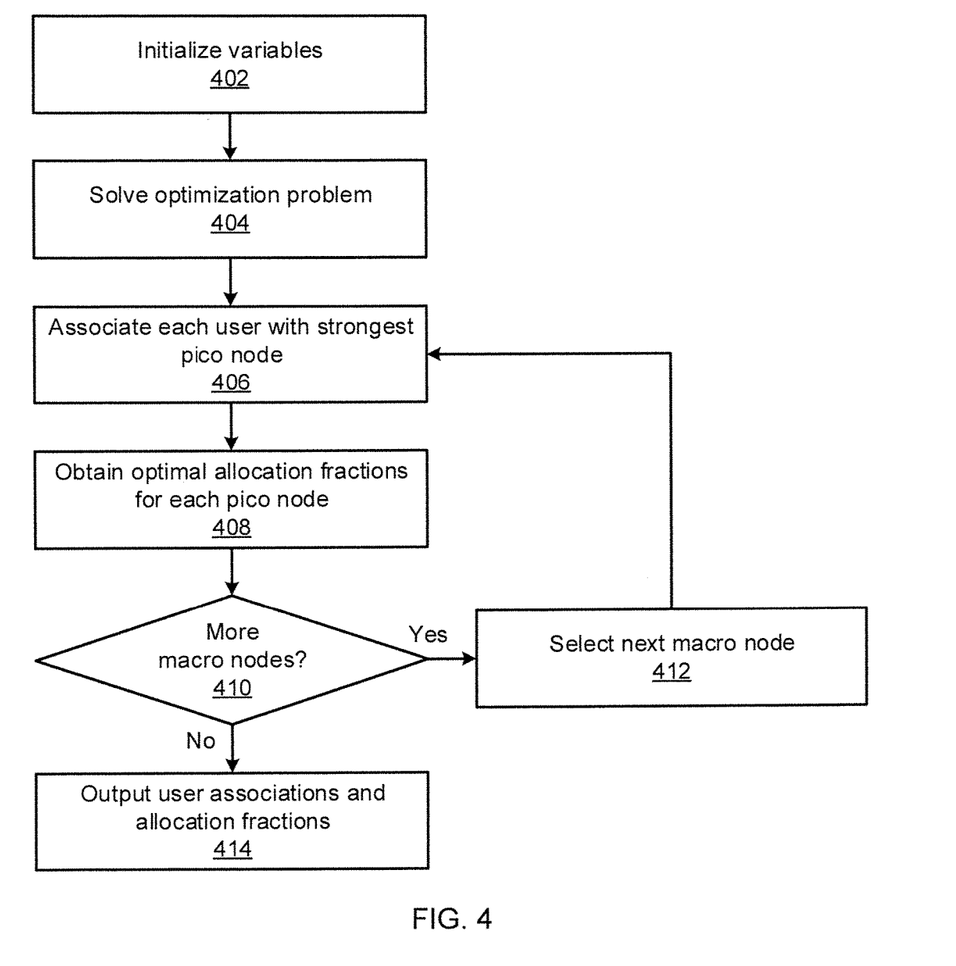
FIG. 4 is a block/flow diagram of a method for determining user allocations and node allocation fractions in accordance with an embodiment of the present invention.

Referring now to FIG. 4, a process for determining user allocations and node allocation fractions is shown. Block 402 initializes the variables with U, M, $B_m$, $\forall m \in M$. Block 404 solves the optimization problem (29). Optimization problem (29) imposes an orthogonal split on (2) and allows for each user to be associated to (and served by) exactly one node. Solving the optimization problem (2) generates a set of user associations that can be enhanced by dual connectivity. Thus the optimization problem (29) sets S=M∪ ($\cup_{m \in M} B_m$) and user associations $\{x_{u,b}\}$, u∈U,b∈S. All users associated to any pico node b∈$B_m$, for any m∈M are also connected to the macro node m and each user associated to a macro node is also associated to a pico node in the set of pico node assigned to that macro node.

For a first macro node m=1, block 406 associates each user 106 associated to that macro node 101 with the pico node 104 associated with the same macro node 102 having a strongest received power at the user device 106. Following the notation defined above, each user with $x_{u,m}$=1 is associated with the strongest pico node in $B_m$. Block 408 then obtains optimal allocation fractions for pico nodes 104 in $B_m$ following (22) above.

Block 410 determines if there are macro nodes with unassociated users. If so, block 412 selects the next macro node (i.e., m=m+1) and processing returns to block 406. If not, block 414 outputs the user associations and allocation fractions. The method of FIG. 4 provides an output that yields an objective value for (2) that is no less than the optimal objective value of (2) minus Π+min{K,$\Sigma_{m \in M}|B_m|$} ln(2).

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

Each computer program may be tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 5:
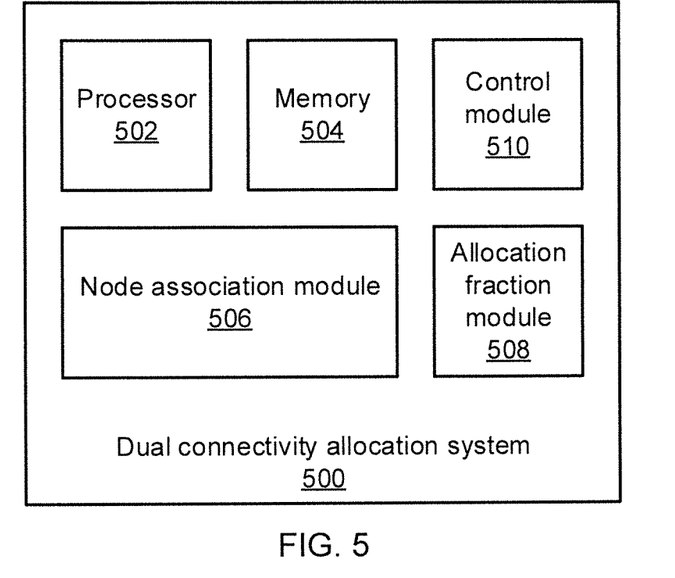
FIG. 5 is a block diagram of a dual connectivity allocation system in accordance with an embodiment of the present invention.

Referring now to FIG. 5, a dual connectivity allocation system 500 is shown. The dual connectivity allocation system 500 may be implemented at one or more macro nodes 102 or pico nodes 104 or may, alternatively, be implemented as a separate component that is in communication with the macro nodes 102 and the pico nodes 104 by any appropriate communications medium. The dual connectivity allocation system 500 includes a hardware processor and memory 504, as well as one or more functional modules. The functional modules may in some embodiments be implemented as software that is stored in the memory 504 and executed by the hardware processor 502 or may, alternatively, be implemented as standalone hardware in the form of, e.g., application specific integrated chips or field programmable gate arrays, or in the form of specialized hardware (e.g., communications interfaces) and software that controls such hardware.

A node association module 506 determines which macro node 102 and pico node 104 a particular user device 106 is associated with. After associating the user with a macro node 102, the node association module 506 selects one pico node 104 from the set of pico nodes 104 associated with the macro node 102 for the user to associate with based on any appropriate selection criterion (e.g., strongest received signal). Allocation fraction module 508 then splits the available resources among the pico nodes 104 and may, for example, assign a portion of a transmission frame or a transmission band to each pico node 104 in accordance with the needs of the associated users.

A control module 510 communicates with the macro nodes 102 and pico nodes 104 and provides the association and allocation fraction assignments. This communication can be performed directly, in embodiments where the dual connectivity allocation system 500 is a part of a macro node 102 or pico node 104, or may alternatively be performed remotely from a centralized or decentralized position via any appropriate wired or wireless communications medium. In embodiments where the control module 510 operates remotely, it will include appropriate communications interface hardware. In this fashion the dual connectivity allocation system 500 provides its control information to the entire network to optimize user services.

Figure 6:
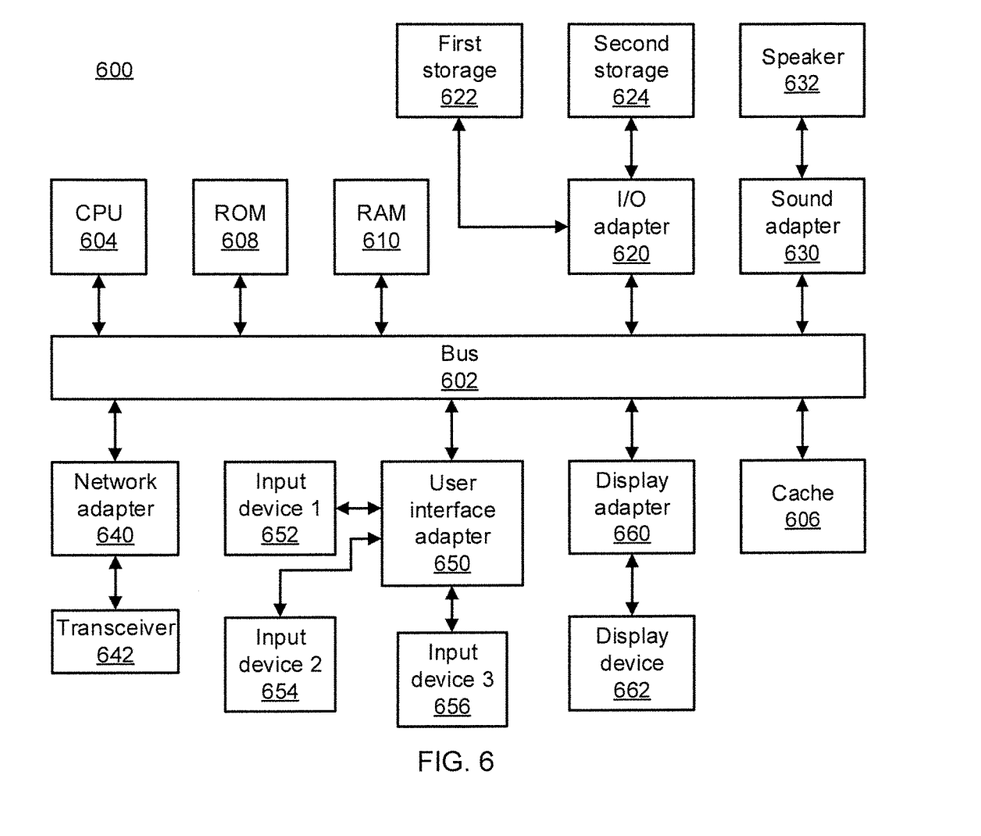
FIG. 6 is a block diagram of a processing system in accordance with an embodiment of the present invention.

Referring now to FIG. 6, an exemplary processing system 600 is shown which may represent the dual connectivity allocation system 500. The processing system 600 includes at least one processor (CPU) 604 operatively coupled to other components via a system bus 602. A cache 606, a Read Only Memory (ROM) 608, a Random Access Memory (RAM) 610, an input/output (I/O) adapter 620, a sound adapter 630, a network adapter 640, a user interface adapter 650, and a display adapter 660, are operatively coupled to the system bus 602.

A first storage device 622 and a second storage device 624 are operatively coupled to system bus 602 by the I/O adapter 620. The storage devices 622 and 624 can be any of a disk storage device (e.g., a magnetic or optical disk storage device), a solid state magnetic device, and so forth. The storage devices 622 and 624 can be the same type of storage device or different types of storage devices.

A speaker 632 is operatively coupled to system bus 602 by the sound adapter 630. A transceiver 642 is operatively coupled to system bus 602 by network adapter 640. A display device 662 is operatively coupled to system bus 602 by display adapter 660.

A first user input device 652, a second user input device 654, and a third user input device 656 are operatively coupled to system bus 602 by user interface adapter 650. The user input devices 652, 654, and 656 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present principles. The user input devices 652, 654, and 656 can be the same type of user input device or different types of user input devices. The user input devices 652, 654, and 656 are used to input and output information to and from system 600.

Of course, the processing system 600 may also include other elements (not shown), as readily contemplated by one of skill in the art, as well as omit certain elements. For example, various other input devices and/or output devices can be included in processing system 600, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 600 are readily contemplated by one of ordinary skill in the art given the teachings of the present principles provided herein.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A method for assigning users to nodes, comprising: assigning a plurality of user devices to respective macro nodes in a wireless network by solving a single optimization problem defined as:

$$\max_{x_{u,b} \in \{0,1\} \forall u \in U, b \in S} \left\{ \sum_{u \in U} \sum_{b \in S} x_{u,b} \ln(R_{u,b}) - \sum_{b \in S} \left( \sum_{k \in U} x_{k,b} \right) \ln\left( \sum_{k \in U} x_{k,b} \right) \right\}$$

$$\text{s.t.} \sum_{b \in S} x_{u,b} = 1, \forall u \in U$$

where $x_{u,b}$ represents an assignment of a user u to a node b, $x_{k,b}$ represents an assignment of a user k to a node b, U represents the set of all users, S represents the set of all macro nodes and pico nodes, and $R_{u,b}$ represents an average peak rate that a user u can receive from a node b;

assigning each of the plurality of user devices to a respective pico node in the wireless network, each respective pico node being associated with the same macro node that the respective user device is assigned to; and assigning resource allocation fractions to all pico nodes and all macro nodes in the wireless network based on the assignment of each of the plurality of user devices respective macro nodes and pico nodes.

2. The method of claim 1, wherein assigning each of the plurality of user devices to a respective pico node comprises assigning each of the plurality of user devices to a pico node that has a highest received signal strength among all pico nodes associated with the same macro node that the user device is assigned to.

3. The method of claim 1, wherein assigning resource allocation fractions to all pico nodes comprises solving an optimization problem for each macro node.

4. The method of claim 1, wherein assigning the plurality of user devices to respective macro nodes and to respective pico nodes comprises generating initial assignments using a greedy approach and refining the initial assignments using an enhanced local search.

5. The method of claim 4, wherein the enhanced local search comprises determining a best swap, deletion, and addition operation for a set of input assignments and performing whichever of the best swap, deletion, and addition operation provides the best improvement.

6. A system for assigning users to nodes, comprising:
a control module in communication with a plurality of macro nodes and a plurality of pico nodes in a wireless network, each of said plurality of pico nodes being associated to a respective one of the plurality of macro nodes, configured to communicate user associations and resource allocation fractions to the plurality of macro nodes and the plurality of pico nodes;
a node association module comprising a processor configured to assign a plurality of user devices to respective macro nodes by solving a single optimization problem and to assign each of the plurality of user devices to a respective pico node, each respective pico node being associated with the same macro node that the respective user device is assigned to, wherein the single optimization problem is defined as $$\max_{x_{u,b} \in \{0,1\} \forall u \in U, b \in S} \left\{ \sum_{u \in U} \sum_{b \in S} x_{u,b} \ln(R_{u,b}) - \sum_{b \in S} \left( \sum_{k \in U} x_{k,b} \right) \ln\left( \sum_{k \in U} x_{k,b} \right) \right\}$$

-continued $$\text{s.t.} \sum_{b \in S} x_{u,b} = 1, \forall u \in U$$

where $x_{u,b}$ represents an assignment of a user u to a node b, $x_{k,b}$ represents an assignment of a user k to a node b, U represents the set of all users, S represents the set of all macro nodes and pico nodes, and $R_{u,b}$ represents an average peak rate that a user u can receive from a node b; and an allocation fraction module configured to assign resource allocation fractions to all pico nodes and all macro nodes based on the assignment of each of the plurality of user devices' respective macro nodes and pico nodes.

7. The system of claim 6, wherein the node association module is further configured to assign each of the plurality of user devices to a pico node that has a highest received signal strength among all pico nodes associated with the same macro node that the user device is assigned to.

8. The system of claim 6, wherein the allocation fraction module is further configured to solve an optimization problem for each macro node to assign resource allocation fractions to all pico nodes and all macro nodes.

9. The system of claim 6, wherein the node association module is further configured to generate initial assignments using a greedy approach and refining the initial assignments using an enhanced local search.

10. The system of claim 9, wherein the node association module is further configured to determine a best swap, deletion, and addition operation for a set of input assignments and to perform whichever of the best swap, deletion, and addition operation provides the best improvement.

* * * * *